(12) United States Patent
Roberts (10) Patent No.: US 9,658,361 B2
(45) Date of Patent: May 23, 2017

(54) LITHOLOGY PAIR RATIO: A RATIO-BASED LITHOLOGY INDICATOR USING PAIR PRODUCTION

(75) Inventor: Loren P. Roberts, Humble, TX (US)

(73) Assignee: BAKER HUGHES INCORPORATED, Houston, TX (US)

( * ) Notice: Subject to any disclaimer, the term of this patent is extended or adjusted under 35 U.S.C. 154(b) by 3 days.

(21) Appl. No.: 13/016,336

(22) Filed: Jan. 28, 2011

(65) Prior Publication Data

US 2011/0198489 A1 Aug. 18, 2011

Related U.S. Application Data

(60) Provisional application No. 61/300,284, filed on Feb. 1, 2010.

(51) Int. Cl.
  *G01V 5/12* (2006.01)
  *G01V 5/10* (2006.01)

(52) U.S. Cl.
  CPC .................... *G01V 5/104* (2013.01)

(58) Field of Classification Search
  USPC ....................................... 250/269.3
  See application file for complete search history.

(56) References Cited

U.S. PATENT DOCUMENTS

| | | | |
|---|---|---|---|
| 3,976,879 A * | 8/1976 | Turcotte | 250/266 |
| 4,492,863 A * | 1/1985 | Smith, Jr. | 250/256 |
| 5,360,066 A * | 11/1994 | Venditto et al. | 166/250.1 |
| 5,608,215 A * | 3/1997 | Evans | G01V 5/101 250/254 |
| 5,900,627 A | 5/1999 | Odom et al. | |
| 6,376,838 B1 | 4/2002 | Odom | |
| 6,936,812 B2 | 8/2005 | Odom et al. | |
| 7,117,092 B2 | 10/2006 | Jacobson | |
| 7,279,677 B2 | 10/2007 | Ellis et al. | |
| 7,294,829 B2 | 11/2007 | Gilchrist | |
| 7,491,929 B2 | 2/2009 | Truax | |
| 7,573,027 B2 | 8/2009 | Huiszoon | |

(Continued)

OTHER PUBLICATIONS

B.A. Roscoe et al. "Use of GSO for Inelastic Gamma-ray Spectroscopy Measurements in a Borehole" IEEE Transactions on Nuclear Science, vol. 39, No. 5, pp. 1412-1416, 1992.*

(Continued)

*Primary Examiner* — Edwin Gunberg
(74) *Attorney, Agent, or Firm* — Mossman Kumar & Tyler PC (57) ABSTRACT

The present disclosure relates to borehole logging methods and apparatuses for estimating formation properties using nuclear radiation, particularly an apparatus and method for estimating a formation lithology parameter. The method may include using gamma ray count or count rate information to estimate a formation lithology parameter that may be one of, but not limited to: $Z^2/A$, bulk density, $Z^2*$bulk density/A, linear attenuation coefficients, and porosity. The method may include using time-dependent ratios with a pulsed radiation source. The method may also include dividing gamma ray information by time and/or by energy window. The apparatus includes a processor and storage subsystem with a program that, when executed, implements the method.

13 Claims, 9 Drawing Sheets

(56) References Cited

U.S. PATENT DOCUMENTS

| | | |
|---|---|---|
| 7,791,017 B2 | 9/2010 | Stephenson et al. |
| 7,897,914 B2 | 3/2011 | Hall et al. |
| 7,902,496 B2 | 3/2011 | Botto et al. |
| 2003/0101011 A1 | 5/2003 | Odom |
| 2009/0039242 A1* | 2/2009 | Botto et al. ............. 250/269.3 |
| 2010/0145621 A1 | 6/2010 | Moake |
| 2010/0187412 A1 | 7/2010 | Grant et al. |
| 2010/0193676 A1 | 8/2010 | Jacobson et al. |
| 2010/0252724 A1 | 10/2010 | Inanc et al. |
| 2010/0332138 A1 | 12/2010 | Inanc et al. |
| 2011/0035151 A1 | 2/2011 | Botto |
| 2011/0049345 A1 | 3/2011 | Roberts |

OTHER PUBLICATIONS

Examination Report in GB1214334.3, dated May 1, 2014.

* cited by examiner

LITHOLOGY PAIR RATIO: A RATIO-BASED LITHOLOGY INDICATOR USING PAIR PRODUCTION

CROSS-REFERENCES TO RELATED APPLICATIONS

This application claims priority from U.S. Provisional Patent Application Ser. No. 61/300,284 filed on 1 Feb. 2010.

FIELD OF THE DISCLOSURE

In one aspect, the present disclosure generally relates to borehole logging methods and apparatuses for estimating a formation lithology parameter using nuclear radiation based measurements. More particularly, the present disclosure relates to estimating a formation lithology parameter using information obtained from an earth formation exposed to a neutron, gamma, or X-ray source.

BACKGROUND OF THE DISCLOSURE

Oil well logging has been known for many years and provides an oil and gas well driller with information about the particular earth formation being drilled. In conventional oil well logging, during well drilling and/or after a well has been drilled, a radiation source and associated radiation detectors may be conveyed into the borehole. Information collected by the associated radiation detectors may be useful in characterizing the formation, which may include estimating one or more parameters of interest of the formation, such as a formation lithology parameter. A rigid or non-rigid carrier is often used to convey the radiation source, often as part of a tool or set of tools, and the carrier may also provide communication channels for sending information up to the surface.

SUMMARY OF THE DISCLOSURE

In aspects, the present disclosure is related to methods and apparatuses for estimating a formation lithology parameter using radiation detected from a subterranean formation.

One embodiment according to the present disclosure includes a method for estimating a lithology parameter of a formation, comprising: estimating the lithology parameter using at least two sets of estimated inelastic gamma ray information in at least one energy window above an energy level required for pair production.

Another embodiment according to the present disclosure includes an apparatus for estimating a lithology parameter, comprising: a processor; a non-transitory computer-readable medium; and a program stored by the non-transitory computer-readable medium comprising instructions that, when executed, cause the processor to: estimate the lithology parameter using at least two sets of estimated inelastic gamma ray information in at least one energy window above an energy level required for pair production.

Examples of the more important features of the disclosure have been summarized rather broadly in order that the detailed description thereof that follows may be better understood and in order that the contributions they represent to the art may be appreciated.

BRIEF DESCRIPTION OF THE DRAWINGS

For a detailed understanding of the present disclosure, reference should be made to the following detailed description of the embodiments, taken in conjunction with the accompanying drawings, in which like elements have been given like numerals, wherein.

DETAILED DESCRIPTION

In aspects, the present disclosure relates to estimating the lithology of a subterranean formation. Illustrative methods for estimating a formation lithology parameter may include modeling high-energy gamma rays detected from the formation and correcting for pair production effects. Formation lithology parameters may include, but are not limited to, $Z^2/A$, bulk density, $Z^2*$bulk density/A, $\mu_{pair\ production}$, $\mu_{compton}$, and porosity. A Lithology Pair Ratio (LPR), or other mathematical relationship, may be used to compare the detected high-energy gamma rays with characteristics of reference formation materials. Herein, "high-energy gamma rays" generally refer to gamma rays with energy levels above those required for pair production, or approximately 1.022 MeV. However, embodiments of the present disclosure may be performed using gamma rays generated through Compton scattering, which may occur within the high and low energy gamma ray ranges. The LPR may be expressed as the following:

$$LPR \equiv \frac{Z^2}{A}, \qquad (1)$$

where Z is the number of protons and A is the atomic mass. LPR may contain density in its formulation, which makes LPR similar in principle to a density-porosity cross-plot lithology indicator. The LPR may be combined with density in a cross-plot to indicate porosity, or combined with porosity to indicate density using the cross-plot technique. In many instances, the information used for these estimations may be acquired by tools deployed into a wellbore intersecting one or more formations of interest. Herein, the term "information" may include, but is not limited to, one or more of: (i) raw data, (ii) processed data, and (iii) signals. For context, an exemplary system for deploying and using such tools to acquire this information is described below.

Figure 1:
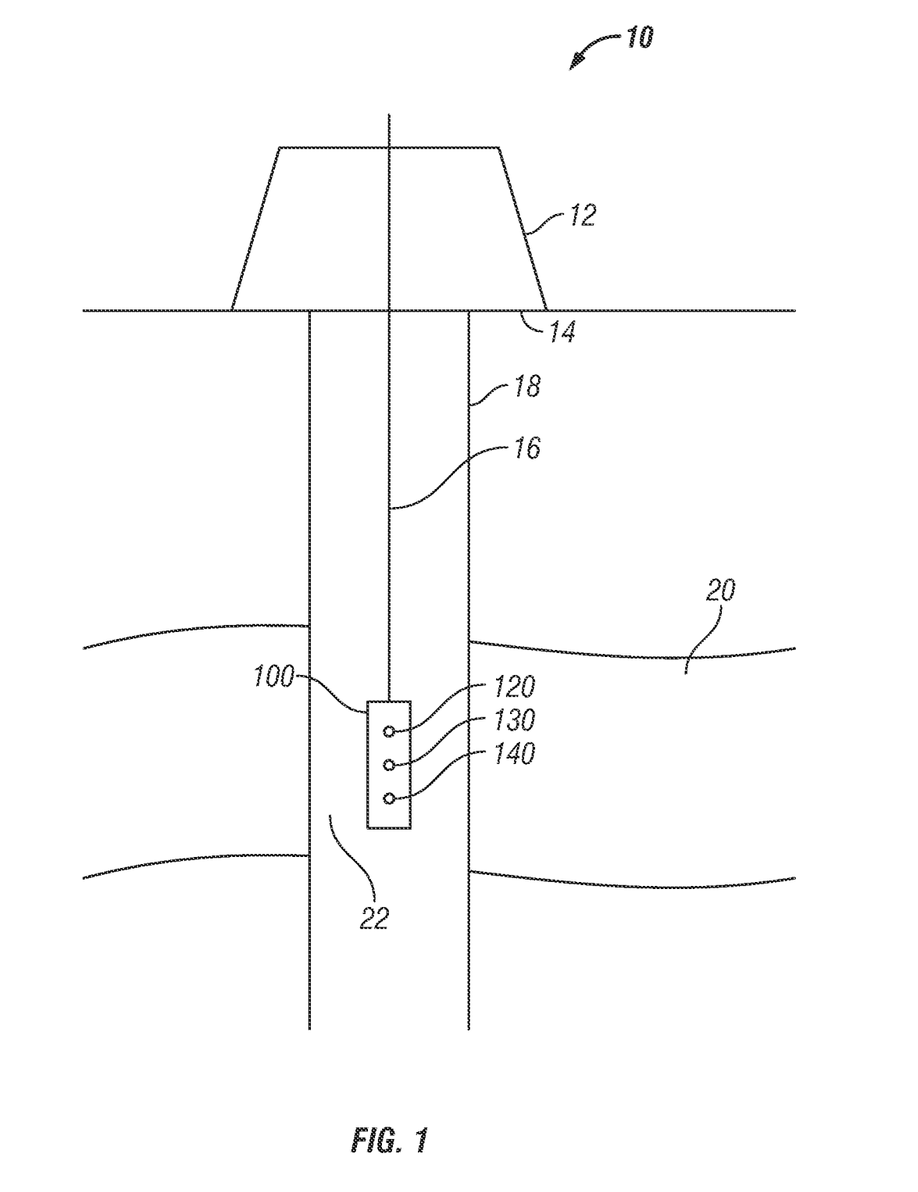
FIG. 1 shows a schematic of a downhole tool deployed in a wellbore along a wireline according to one embodiment of the present disclosure.

FIG. 1 schematically illustrates a drilling system 10 having a downhole tool 100 configured to acquire information for estimating a formation lithology parameter of a formation 20. In one illustrative embodiment, the tool 100 may contain a radiation source 140 and associated detectors 120, 130. The system 10 may include a conventional rig 12 erected on a rig floor 14. A carrier 16, which may be rigid or non-rigid, may be configured to convey the downhole tool 100 into wellbore 18 in proximity to earth formation 20. The carrier 16 may be a drill string, coiled tubing, a slickline, an e-line, a wireline, etc. Downhole tool 100 may be coupled or combined with additional tools (e.g., some or all the information processing system of FIG. 3). Thus, depending on the configuration, the tool 100 may be used during drilling and/or after the wellbore 18 has been formed.

The radiation source 140 may emit radiation into the earth formation to be surveyed. Herein, the radiation source 140 may include, but is not limited to, one or more of: (i) a neutron source, (ii) a gamma-ray source, and (iii) an x-ray source. The detector(s) 120, 130 may be used to detect radiation from the earth formation, though the detectors 120, 130 are not limited to detecting radiation of the same type as emitted by the radiation source 140. While two detectors 120, 130 are shown in FIG. 1, embodiments of the present disclosure may use one or more detectors. In some embodiments, radiation shielding (not shown) may be used to prevent the counting of radiation from unintended sources by the detectors 120, 130. Radiation from the radiation source 140 may interact with the nuclei and electrons of the atoms of the material of the earth formation and may result in the emission of one or more of: (i) inelastic gamma rays, (ii) capture gamma rays, (iii) Compton scattered photons, and (iv) pair production photons. Previously, some formation lithology parameters have been calculated using the Photoelectric Index (PE), which is a measure of how low-energy gamma rays are absorbed by an earth formation. However, PE measurement is highly sensitive to barite, and drilling fluid often contains barite to increase density and pressure head in the borehole. High-energy gamma rays may be relatively insensitive to barite concentrations commonly found in drilling fluid (approximately 30% barite and 70% water) when compared with PE based methods. This barite concentration is illustrative and exemplary only, as embodiments of the present disclosure may be performed over a wide range of barite concentrations. In one embodiment, the downhole tool 100 may use a pulsed neutron generator emitting 14.2 MeV fast neutrons as its radiation source 140. The use of 14.2 MeV neutrons from a pulsed neutron source is illustrative and exemplary only, as different energy levels of neutrons may be used. In some embodiments, the radiation source 140 may use X-rays or gamma rays. In some embodiments, the radiation source 140 may be continuous.

In some embodiments, the radiation source 140 may be controllable in that the radiation source may be turned "on" and "off" while in the wellbore, as opposed to a radiation source that is "on" continuously. This type of radiation source may be called "sourceless" since it does not have a continuous radiation source. Due to the intermittent nature of the radiation source, the inelastic and capture photons created will reach the detectors 120, 130 during overlapping time periods. Inelastic photons are generated predominantly during the pulse, while capture photons are generated during and after the pulse. This time difference may allow for the radiation detector information to be divided not only in terms of the energy level of the gamma rays received but in terms of when the gamma rays are received by the detectors 120, 130, as it is well known that inelastic gamma rays may arrive at the detectors predominantly prior to the arrival of captured gamma rays. Additionally, radiation information may be estimated for each individual detector or as an aggregate of radiation counts received by all detectors 120, 130.

The detectors 120, 130 provide signals that may be used to estimate the radiation counts returning from the earth formation. Generally, detectors 120, 130 are spaced in a substantially linear fashion relative to the radiation source. If two detectors are used, there may be a short spaced (SS) detector and a long spaced (LS) detector, wherein the detectors have different distances from the radiation source. For instance, in one embodiment, detector 130 may be a short spaced detector, and detector 120 may be a long spaced detector. The SS and LS detectors are not limited to being placed on the same side of the radiation source and their spacing from the radiation source may be the equal or unequal since the response of the detectors does not depend on the spatial variation of the gamma ray source within the earth formation. Detectors 120, 130 may be preferably placed on one side of the source to improve vertical resolution of the measurement. Additional detectors may be used to provide additional radiation information. At least two of the detectors may be gamma ray detectors. Radiation shielding (not shown) may be located between radiation source 140 and the detectors 120, 130. Radiation shielding may include, but is not limited to, gamma-ray shielding and neutron shielding. Gamma ray shielding may prevent the detection of gamma rays from behind the tool and from that originating within the tool. Neutron shielding may prevent neutrons from reaching the detector regions and inducing gamma rays. The radiation shielding may include one or more of neutron moderators, neutron absorbers, high hydrogen content epoxies, and high-density high-Z materials known to those skilled in the art.

Drilling fluid 22 may be present between the earth formation 20 and the downhole tool 100, such that emissions from radiation source 140 may pass through drilling fluid 22 to reach earth formation 20 and radiation induced in the earth formation 20 may pass through drilling fluid 22 to reach the detectors 120, 130.

In one embodiment, electronics (not shown) associated with the detectors may be capable of recording counts from at least two axially spaced detectors 120, 130 with very narrow time bins or windows (on the order of 1 to 1000 microseconds) and generating a time-dependent ratio between the at least two axially spaced detectors by using information from multiple bursts. This ratio may be expressed as a curve or other graphical function that describes a combination of multiple ratio values. In some embodiments, the parameter of interest may be estimated using a difference between the detector counts. Herein, the term "time-dependent" broadly describes the property of the ratio to vary with time, as opposed to a ratio that remains constant, such as with a continuous radiation source. In some embodiments, the time-dependent ratio may be weighted. The axially spaced detector count rate ratios may be obtained as a function of time and graphically illustrated as a time-dependent ratio curve. Various properties of the earth formation may be determined using the time-dependent ratio curve, including, but not limited to, formation lithology parameters. In other embodiments, such electronics may be located elsewhere (e.g., at the surface).

Figure 2:
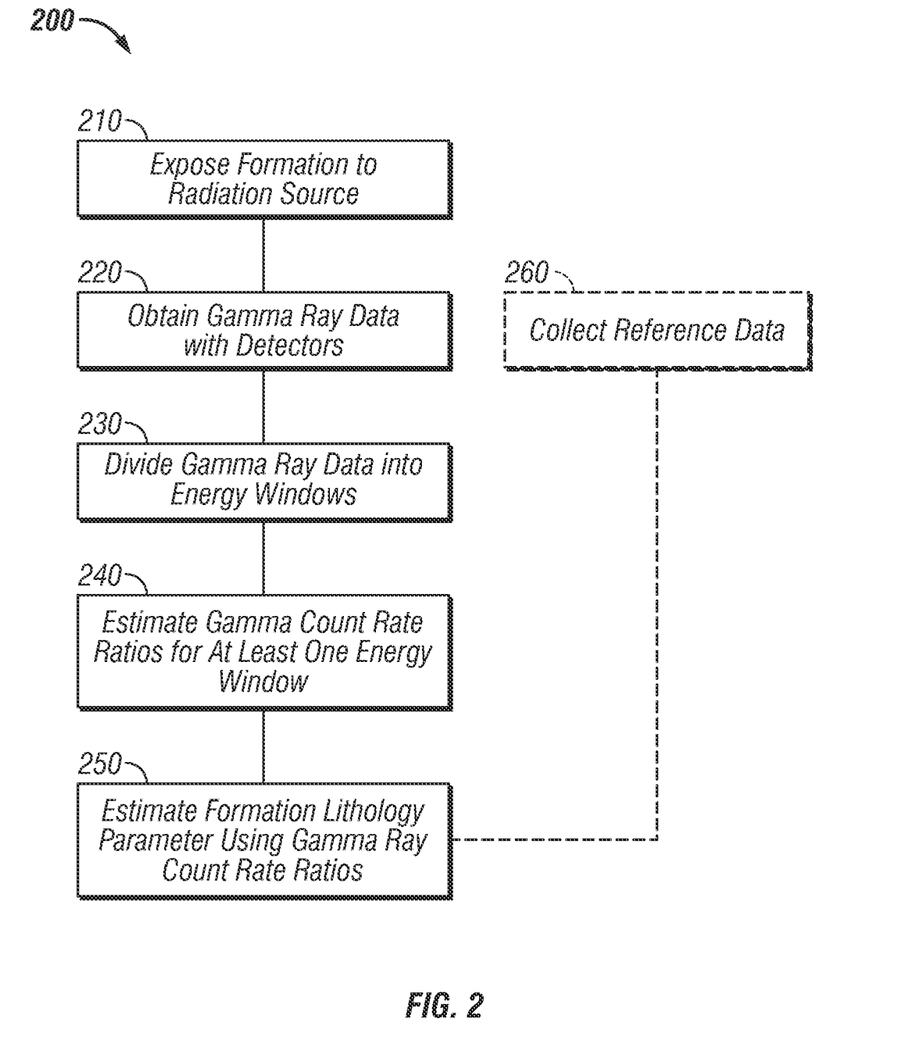
FIG. 2 shows a flow chart of an estimation method for one embodiment according to the present disclosure.

FIG. 2 shows a flow chart of one method 200 according one embodiment of the present disclosure for estimating the lithology of earth formation 20 (FIG. 1) using a model based on information acquired from at least two gamma ray detectors 120, 130 (FIG. 1). Referring now to FIGS. 1 and 2, method 200 may include step 210, where the radiation source 140 emits radiation in proximity to the earth formation 20. In step 220, information relating to gamma rays may be collected by the detectors 120, 130. In step 230, gamma ray information may be divided into energy windows based on count rate. In step 240, the ratios of the gamma ray count rates for at least one of the energy windows may be estimated. Within the model, the energy window used for the gamma ray information from the first detector 130 and the energy window used for the gamma ray information from the second detector 120 may be the same energy window or a different energy window. Thus, a formation lithology parameter may be estimated using two detectors and one or more energy windows. The use of gamma ray count rates is illustrative and exemplary only, as other information, such as gamma ray counts may be used for developing the ratios. These ratios may be correlated to the linear attenuation coefficient form the following relationships:

$$\left.\frac{I_2}{I_1}\right|_N = e^{-(\mu_c + \mu_{pp})\Delta x} \quad (2)$$

$$\left.\frac{I_2}{I_1}\right|_{N-1} = e^{-(d\mu_c + e\mu_{pp})\Delta x} \quad (3)$$

where I is the gamma ray count rate for the at least two detectors 120, 130; $\mu_c$, is the linear attenuation coefficient due to Compton scattering; $\mu_{pp}$ is the linear attenuation coefficient due to pair production; $\Delta x$ is the difference in path length between the at least two detectors 120, 130; and d and e are coefficients to relate $\mu_c$ and $\mu_{pp}$ between the different energy windows.

In one embodiment, the method may use only one detector and at least three energy windows to solve the below equations for the linear attenuation coefficients:

$$\left.\frac{I_N}{I_{N-1}}\right|_1 = e^{-(f\mu_c + g\mu_{pp})} \quad (4)$$

$$\left.\frac{I_N}{I_{N-2}}\right|_1 = e^{-(h\mu_c + j\mu_{pp})} \quad (5)$$

where f, g, h, and j are coefficients to relate $\mu_c$, and $\mu_{pp}$ between the different energy windows, and N refers to the energy window within the one detector, and $\Delta x$ does not appear in the equations.

Step 240 may also include correction for pair production. Correction may be required since, generally, Compton scattering is proportional to Z/A*bulk density, and Z/A is ≈0.5 for most materials. Thus, Compton scattering information may be used for density correlation. However, pair production is proportional to $Z^2/A$, which gives a range of formation lithology parameter values distinct from Compton scattering.

For correction, firstly, pair production may be numerically correlated to a measurement of the 511 keV peak due to positron annihilation. Accounting may need to be made for Compton scattering within the detector that also generates 511 keV photons. A priori knowledge of the detector material and a detector response function may be combined with the measured high-energy photon spectrum to calculate the 511 keV response due to pair production in the detector.

Pair production may also be accounted for by using multiple energy window ratios (or, peak reductions) to solve a system of linear equations in a direct or least squares sense to determine the pair production effect on the density measurement. Pair production may be parameterized for common formation materials as a function of energy and elemental composition.

Finally, pair production may be accounted using a spine and rib based method where the ribs are used for quantifying pair production effects. A unique rib may be calculated for each energy peak and each material type. These ribs can be A) combined into a parameterized form to correct the bulk density estimates with no knowledge of lithology, B) used individually with apriori knowledge of approximate lithology, C) used individually with measured mineralogical composition, and D) collapsed to a single approximated rib (e.g. limestone density). The measure of peak reduction described above can be used to solve a system of equations in a least squares sense to determine the pair production correction (ribs).

In step 250, one or more formation lithology parameters may be estimated using the ratios and coefficients obtained based on the gamma ray information. The estimation of the formation lithology parameter may also include comparison or combination of the gamma ray information with reference information about the earth formation. In some embodiments, estimation method 200 may include step 260, where reference information on the earth formation or formations generally is accessed. Reference information may be combined with gamma ray information in step 250 to estimate a formation lithology parameter.

Figure 3:
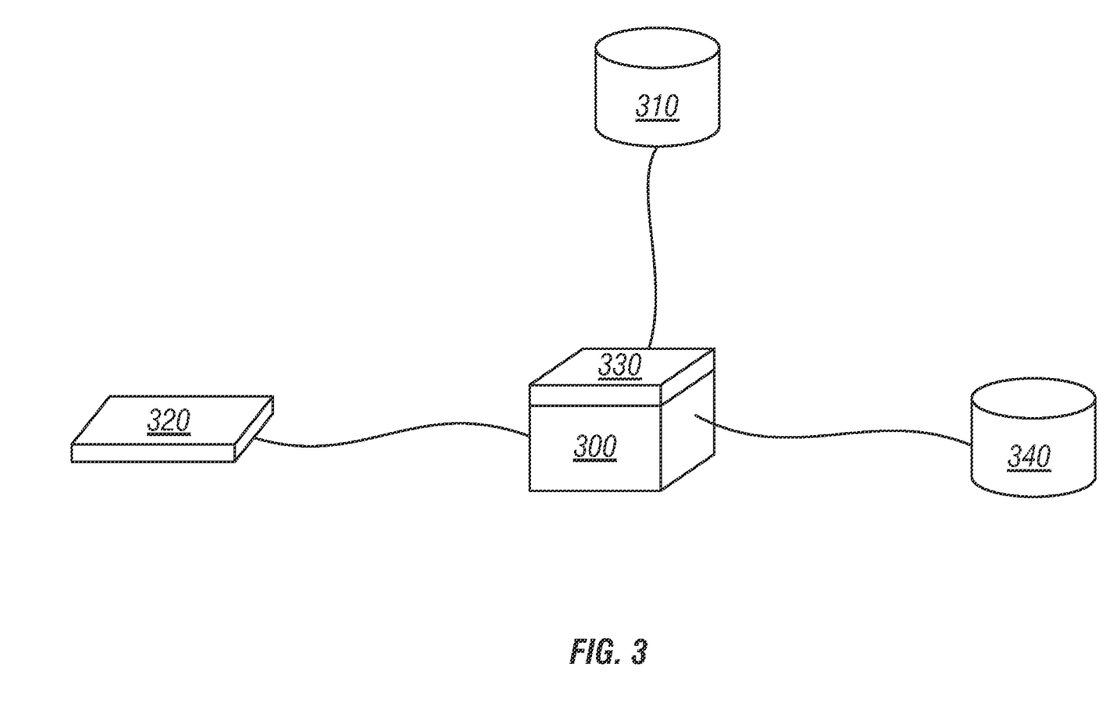
FIG. 3 shows schematic of the apparatus for implementing one embodiment of the method according to the present disclosure.

As shown in FIG. 3, certain embodiments of the present disclosure may be implemented with a hardware environment that includes an information processor 300, an information storage medium 310, an input device 320, processor memory 330, and may include peripheral information storage medium 340. The hardware environment may be in the well, at the rig, or at a remote location. Moreover, the several components of the hardware environment may be distributed among those locations. The input device 320 may be any information reader or user input device, such as data card reader, keyboard, USB port, etc. The information storage medium 310 stores information provided by the detectors. Information storage medium 310 may be any standard computer information storage device, including non-transitory computer-readable media such as a USB drive, memory stick, hard disk, removable RAM, EPROMs, EAROMs, flash memories and optical disks or other commonly used memory storage system known to one of ordinary skill in the art including Internet-based storage. Information storage medium 310 stores a program that when executed causes information processor 300 to execute the disclosed method. Information storage medium 310 may also store the formation information provided by the user, or the formation information may be stored in a peripheral information storage medium 340, which may be any standard computer information storage device, such as a USB drive, memory stick, hard disk, removable RAM, or other commonly used memory storage system known to one of ordinary skill in the art including Internet based storage. Information processor 300 may be any form of computer or mathematical processing hardware, including Internet based hardware. When the program is loaded from information storage medium 310 into processor memory 330 (e.g. computer RAM), the program, when executed, causes information processor 300 to retrieve detector information from either information storage medium 310 or peripheral information storage medium 340 and process the information to estimate a formation lithology parameter. Information processor 300 may be located on the surface or downhole.

This time-dependence of the gamma ray information may allow for pair production correction of the gamma ray information, which may improve estimates of the formation lithology parameter. In embodiments where gamma ray information may be captured at energy levels starting at the minimum for pair production and higher, there may be a need for pair production correction due to the possible interactions including both Compton scattering and pair production. Pair production removes a photon from the system, which, if uncorrected, results in an overestimated Compton scattering probability. Compton scattering probability may be converted to a formation lithology parameter by methods known to those skilled in the art.

When using gamma ray count rate ratios in step 240, the linear attenuation coefficient for single chemical elements Where, N may be about 4-5 for photoelectric, 1 for Compton scattering, and 2 for pair production; i is for each element in the mixture; $w_i$ is the weight fraction of the $i^{th}$ element. The material parameters for common formations, barite, and common barite-weighted fluids are shown below. The parameters are the bulk density, effective Z for photoelectric, effective Z for pair production, effective A for pair production, the $Z^2/A$ LPR, and the photoelectric index. The barite mixtures exhibit a high PE Index, but a $Z^2/A$ LPR that is similar to limestone and sandstone. The $Z^2/A$ LPR exhibits a range of values for these common formation materials such that knowing $Z^2/A$ allows for indication of lithology and fluid-filled porosity.

| Material | Reference Composition | Bulk Density | Z-Effective (PE) | Z-Effective (PP) | A-Effective | PP $Z^2/A$ | PE Index |
|---|---|---|---|---|---|---|---|
| Limestone | CaCO3 | 2.71 | 15.14 | 12.56 | 25.15 | 6.27 | 4.45 |
| Sandstone | SiO2 | 2.85 | 11.80 | 10.82 | 21.68 | 5.40 | 1.71 |
| Dolomite | CaMg(CO3)2 | 2.87 | 13.16 | 10.90 | 21.86 | 5.44 | 2.69 |
| Water | H2O | 1.00 | 7.69 | 7.22 | 14.33 | 3.64 | 0.39 |
| Barite | BaSO4 | 4.48 | 47.03 | 37.34 | 59.60 | 15.56 | 263.44 |
|  | 10% barite 90% water | 1.35 | 22.11 | 10.24 | 21.86 | 4.79 | 17.41 |
|  | 30% barite 70% water | 2.04 | 31.59 | 16.26 | 36.91 | 7.16 | 62.88 | may hold to the following equation that converts the linear attenuation coefficient for pair production of lead to any other element:

$$\mu = \mu_{Pb} \frac{\rho}{11.35} \frac{207.2}{A} \left(\frac{Z}{82}\right)^2 \quad (4)$$

Figure 7:
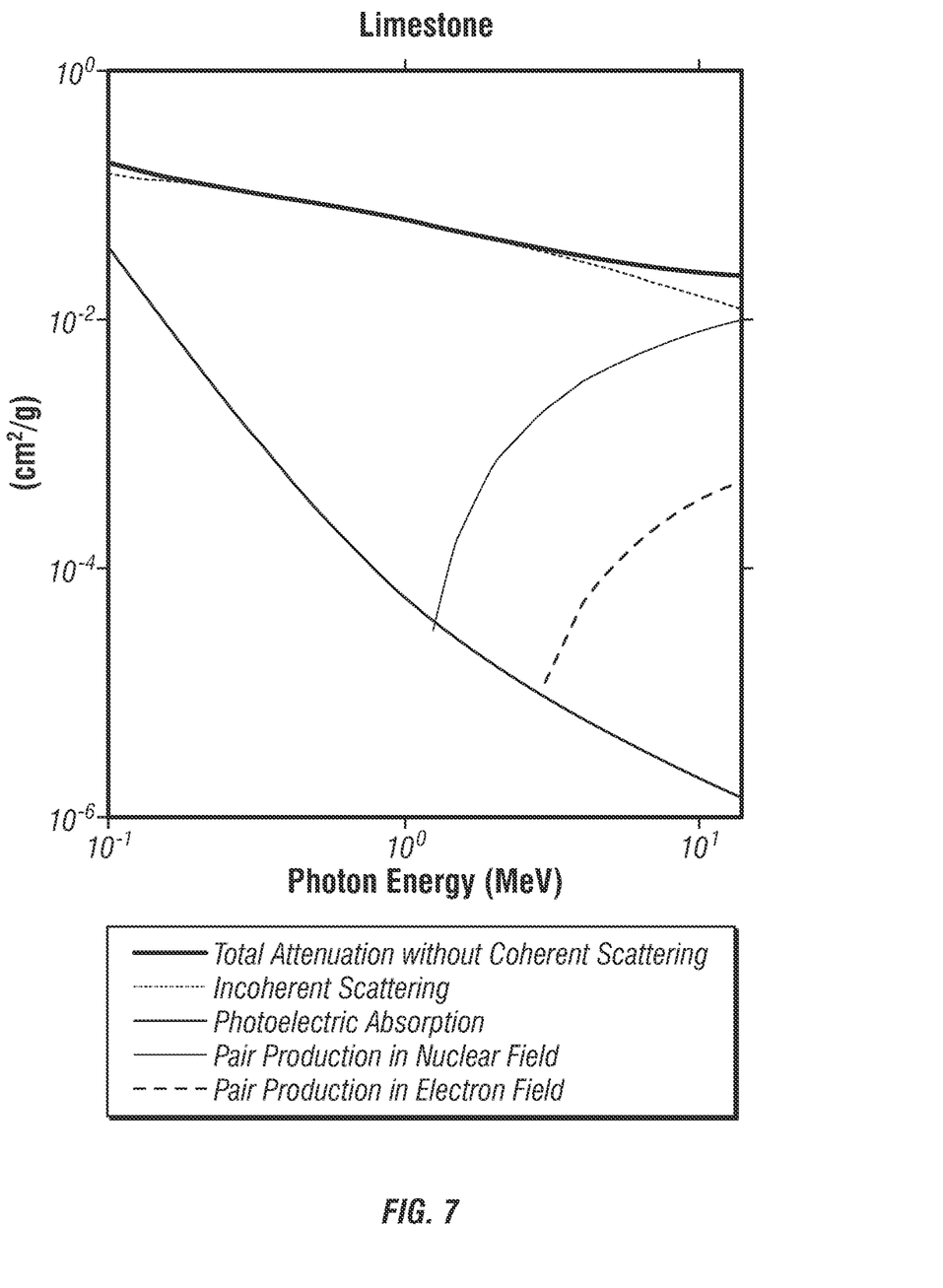
FIG. 7 shows a graphical illustration of the attenuation characteristics of limestone.
Figure 8:
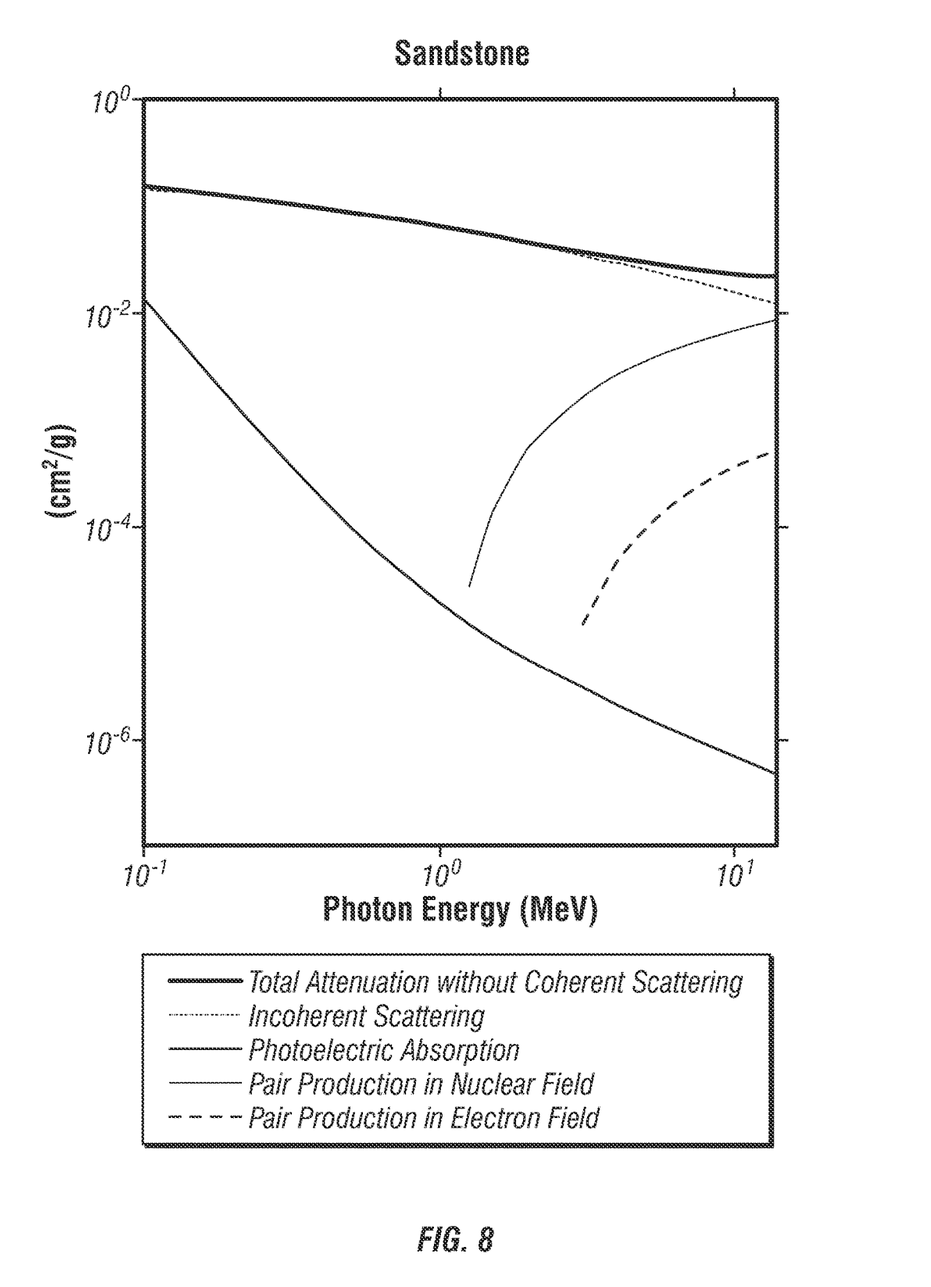
FIG. 8 shows a graphical illustration of the attenuation characteristics of sandstone.
Figure 9:
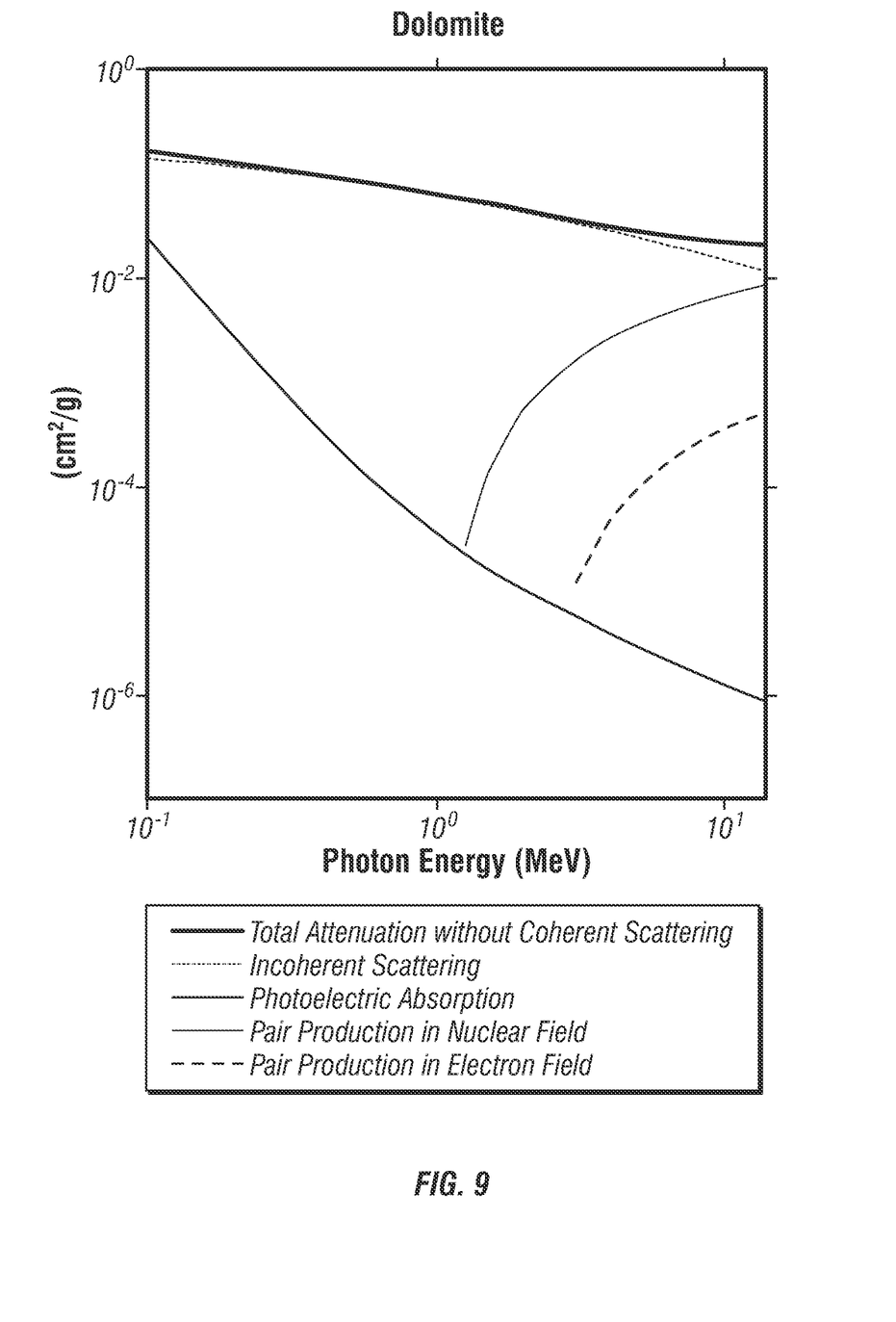
FIG. 9 shows a graphical illustration of the attenuation characteristics of dolomite.

In practice, $\mu$, the total linear attenuation coefficient, may be measured from ratios of energy windows at the high end of the energy spectrum where pair production may have the highest effect. The Compton scattering and pair production linear attenuation coefficients for common formation materials are shown in FIGS. 7-9. $\rho$ may be provided from a separate logging measurement. Then, $Z^2/A$ may be obtained and correlated to known formation values of $Z^2/A$.

However, this relation usually does not hold for mixtures unless individual elemental contributions are calculated and then combined based on weight fraction (or, atom fraction). A new relationship that may convert between the linear attenuation coefficients of common formations may be used. For example, values for limestone may be used as a base case and then the limestone values may be converted to corresponding values for sandstone, dolomite, etc. This conversion may be accomplished by calculating $Z_{effective}$ and $A_{effective}$ of the mixture and then inserting optimized coefficients into the equation to account for the change in composition. $Z_{effective}$ and $A_{effective}$ correspond to average Z and A values for the mixture which is approximately equivalent to elemental Z and A values. Many techniques exist to calculate $Z_{effective}$ and $A_{effective}$ individually for the photoelectric effect, Compton scattering, and pair production. One technique is to use a weight fraction based summation of Z and A, as follows:

$$Z_{effective}^{N-1} = \sum_i w_i Z^{N-1} \quad (6)$$

$$A_{effective}^{N-1} = \sum_i w_i A^{N-1} \quad (7)$$

The conversion may be expressed, but is not limited to, the following form:

$$\mu = C \cdot \mu_{limestone} \frac{\rho}{2.71} \frac{25.2}{A_{effective}} \left(\frac{Z_{effective}}{15.1}\right)^2, \quad (8)$$

where C may be a general scaling term determined to optimally convert between the set of formations considered. C may be general and may be a function of energy, detector positioning, etc. A weighted combination of formations may be used to optimize for ones of highest importance, wherein importance may be related to the likelihood of finding desirable substances, such as oil or natural gas. The formations of highest importance are commonly generalized as limestone, sandstone, and dolomite for well logging equipment calibration, but this may vary by geological region, specific borehole conditions, and human judgment. A linear or power term may also be added to correct the calculated values for the effects of screening. Screening may occur at higher energies (typically >5 MeV) when the electron cloud of an atom screens the charge of the nucleus as seen from a photon outside the atomic radius. This screening effectively changes the Z and A dependence of the pair production, however, this change may be generally small at the energy levels being detected.

Figure 4:
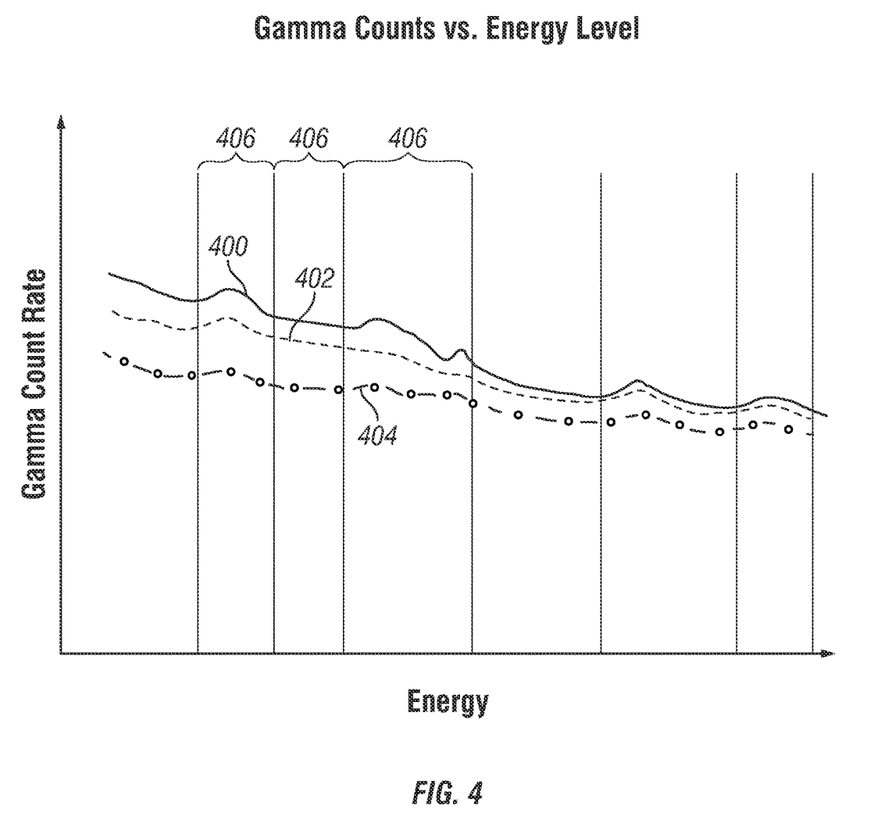
FIG. 4 shows a graphical illustration of gamma ray count rates divided into energy windows according to one embodiment of the present disclosure.
Figure 5:
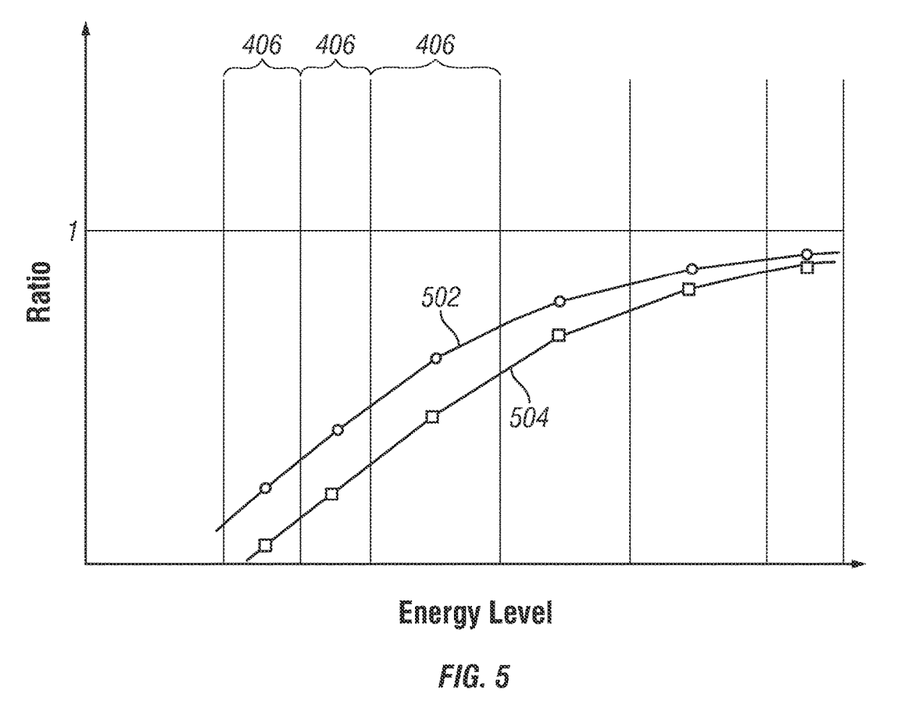
FIG. 5 shows a graphical illustration of gamma ray information ratios between detector pairs according to one embodiment of the present disclosure.

FIG. 4 illustrates sample gamma ray information obtained during step 230 from three detectors. The information may be expressed as curves 400, 402, 404 and divided into energy windows 406. These gamma ray information curves 400, 402, 404 may be expressed as ratios 502, 504 in step 240, as shown in FIG. 5 The ratios 502, 504 may be used, in step 250, to estimate one or more formation lithology parameters. Higher energy windows 406 may tend to have higher pair production effects and lower Compton effects. Higher energy windows 406 may also be desirable due to a lower signal gain requirement and lower amounts of signal noise due to the lower signal gain requirement. Information recorded by a single detector and separated into three or more energy windows may also be used to construct ratios and, in step 250, to estimate one or more formation lithology parameters.

Figure 6:
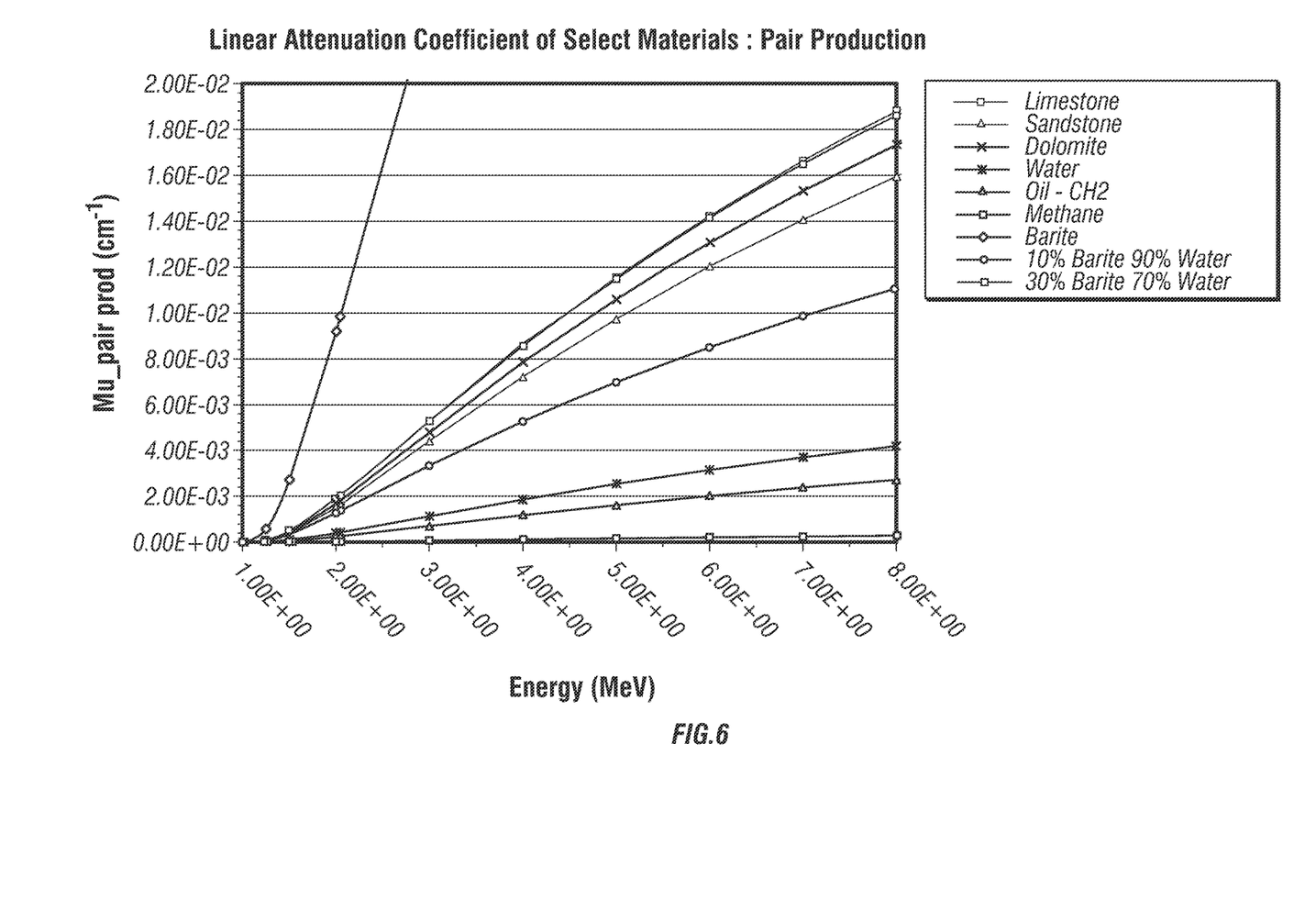
FIG. 6 shows a graphical illustration of linear attenuation coefficients for common formation materials.

In one aspect, the linear attenuation coefficient may be used to identify formation lithology, as shown in FIG. 6, since linear attenuation coefficients may be known for common formation materials. The linear attenuation coefficient for pair production and Compton scattering may be used without further conversion as a formation lithology parameter, although conversion to the LPR may be preferable in some situations. FIG. 6 also shows the dynamic range of linear attenuation coefficients for different materials found in formations. Since pair production is more dominant at higher energy levels, FIG. 6 shows that the individual linear attenuation coefficients tend to be more distinct at the higher energy levels.

FIGS. 7-9 show radiation properties for formations made of limestone, sandstone, and dolomite when exposed to a radiation source. Consistently, FIGS. 7-9 show that the photoelectric effect is significant only at low gamma ray energies, and above the pair production threshold (approximately 1.022 MeV), the dominant interaction mechanisms are pair production and Compton scattering. For the generally low Z formation materials encountered, pair production will not dominate the Compton interaction mechanism until much higher gamma ray energies than is shown in the figures.

While the foregoing disclosure is directed to the one mode embodiments of the disclosure, various modifications will be apparent to those skilled in the art. It is intended that all variations be embraced by the foregoing disclosure.

I claim:

1. A method for estimating a lithology of a formation intersected by a borehole, comprising:
    irradiating the formation with a neutron source conveyed in the borehole;
    generating at least three sets of the inelastic gamma ray information in at least one energy window above an energy level required for pair production by detecting gamma rays in the borehole from inelastic neutron scattering responsive to the irradiating;
    using at least one processor to estimate the lithology using the at least three sets of the estimated inelastic gamma ray information obtained in the borehole to estimate a pair production linear attenuation coefficient reflective of differences between the at least three sets attributable to attenuation from pair production by:
        using a ratio between a first set of the at least three sets in a first energy window and a second set of the at least three sets in a second energy window and a second ratio between the first set and a third set of the at least three sets in a third energy window to solve for the pair production linear attenuation coefficient; and
        using the pair production linear attenuation coefficient to estimate the lithology.

2. The method of claim 1, wherein the at least three sets of estimated inelastic gamma ray information include at least one of: a gamma ray count and a gamma ray count rate.

3. The method of claim 1, wherein the lithology parameter is one of: (i) $Z^2/A$, (ii) bulk density, (iii) $Z^2$*bulk density/A, (iv) $\mu_{pair\ production}$, (v) $\mu_{compton}$, and (vi) porosity, wherein Z is the atomic number of the formation and A is the atomic mass of the formation.

4. The method of claim 1, wherein the lithology is estimated using a difference between two of the at least two sets of estimated inelastic gamma ray information.

5. An apparatus for estimating a lithology of a formation intersected by a borehole, comprising:
    a neutron source configured to irradiate the formation from the borehole;
    at least one radiation detector configured to generate at least three sets of the inelastic gamma ray information in at least one energy window above an energy level required for pair production by detecting gamma rays in the borehole from inelastic neutron scattering responsive to irradiation of the formation by the neutron source;
    at least one processor;
    a non-transitory computer-readable medium; and
    a program stored by the non-transitory computer-readable medium comprising instructions that, when executed, cause the at least one processor to:
        estimate the lithology using the at least three sets of the estimated inelastic gamma ray information obtained in the borehole to estimate a pair production linear attenuation coefficient reflective of differences between the at least three sets attributable to attenuation from pair production by:
            using a ratio between a first set of the at least three sets in a first energy window and a second set of the at least three sets in a second energy window and a second ratio between the first set and a third set of the at least three sets in a third energy window to solve for the pair production linear attenuation coefficient; and
            using the pair production linear attenuation coefficient to estimate the lithology.

6. The apparatus of claim 5, wherein the at least three sets of estimated inelastic gamma ray information include at least one of: a gamma ray count and a gamma ray count rate.

7. The apparatus of claim 5, wherein the lithology parameter is one of: (i) $Z^2/A$, (ii) bulk density, (iii) $Z^2$*bulk density/A, (iv) $\mu_{pair\ production}$, (v) $\mu_{compton}$, and (vi) porosity, wherein Z is the atomic number of the formation and A is the atomic mass of the formation.

8. The apparatus of claim 5, wherein the lithology is estimated using a difference between two of the at least two sets of estimated inelastic gamma ray information.

9. The method of claim 1, further comprising estimating the lithology using an estimated lithology parameter.

10. The apparatus of claim 5, wherein the non-transitory computer-readable medium further comprises instructions for estimating the lithology using an estimated lithology parameter.

11. The method of claim 1, wherein estimating the lithology comprises using a known linear pair production attenuation coefficient corresponding to a particular lithology and the estimated pair production linear attenuation coefficient to estimate a parameter indicative of a lithology pair ratio.

12. The apparatus of claim 5, wherein the non-transitory computer-readable medium further comprises instructions for estimating the lithology using a known pair production linear attenuation coefficient corresponding to a particular lithology and the estimated pair production linear attenuation coefficient to estimate a parameter indicative of a lithology pair ratio.

13. A method for estimating a lithology of a formation intersected by a borehole, comprising:
    irradiating the formation with a neutron source conveyed in the borehole;
    using at least two spaced apart detectors to obtain at least two sets of estimated inelastic gamma ray information in the borehole in at least one energy window above an energy level required for pair production responsive to the irradiating;

using at least one processor to estimate the lithology using the at least two sets of estimated inelastic gamma ray information to estimate a pair production linear attenuation coefficient reflective of differences between the two sets attributable to attenuation from pair production, wherein the inelastic gamma ray information is related to gamma rays from inelastic neutron scattering, by:

modeling the differences in a model using a difference in path length between a first path length from a source of radiation to a first detector of the at least two spaced apart detectors and a second path length from the source of radiation to a second detector of the at least two spaced apart detectors; and solving for the pair production linear attenuation coefficient using
  i) the model,
  ii) a ratio between responses in a first energy window for a first set of the at least two sets at the first detector and a second set of the at least two sets at the second detector, and
  iii) a second ratio between responses in a second energy window for a first set of the at least two sets at the first detector and a second set of the at least two sets at the second detector;

using the pair production linear attenuation coefficient to estimate the lithology.

* * * * *